United States Patent

Prabhakaran et al.

(10) Patent No.: US 6,859,758 B1
(45) Date of Patent: Feb. 22, 2005

(54) STRESS TESTING DATABASE STORAGE

(75) Inventors: Kothandaraman Prabhakaran, Morrisville, NC (US); Don Wence, Cary, NC (US); Brian Christensen, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 10/292,616

(22) Filed: Nov. 12, 2002

(51) Int. Cl.[7] .............................................. G06F 11/30
(52) U.S. Cl. ........................ 702/186; 707/200; 711/112
(58) Field of Search ............................. 702/80, 81, 90, 702/118–123, 176, 177, 178, 179, 181, 182, 183, 184, 186, 188; 711/112, 129, 173; 709/224; 707/200, 1; 703/13; 714/32, 38, 715

(56) References Cited

U.S. PATENT DOCUMENTS

| | | | | |
|---|---|---|---|---|
| 5,889,955 A | * | 3/1999 | Shinozaki et al. | 709/224 |
| 6,002,871 A | * | 12/1999 | Duggan et al. | 717/135 |
| 6,052,694 A | * | 4/2000 | Bromberg | 707/200 |
| 6,088,767 A | * | 7/2000 | Dan et al. | 711/129 |
| 6,324,492 B1 | * | 11/2001 | Rowe | 703/13 |
| 6,449,688 B1 | * | 9/2002 | Peters et al. | 711/112 |
| 6,681,309 B2 | * | 1/2004 | Szendy et al. | 711/173 |
| 6,731,551 B2 | * | 5/2004 | Pekny | 365/201 |
| 6,766,267 B2 | * | 7/2004 | Floyd et al. | 702/120 |

OTHER PUBLICATIONS

Mike Schelstrate, Stress Testing Data Access components in Window DNA Applications. Microsoft Corpotation.*

* cited by examiner

*Primary Examiner*—Patrick Assouad
*Assistant Examiner*—Mohamed Charioui

(57) ABSTRACT

A method and system for stress testing database storage. Stress testing software generates read and/or write commands to a database engine. Preferably, the read and write commands adhere to a desired ratio of reads to writes. The commands are interpreted by the database engine. The database engine issues read and/or write instructions to a database storage system. Multiple instances of the stress testing software may be spawned against a plurality of databases in order to achieve a desired aggregate rate of operations to the database storage system. Performance measurements of the database storage system are obtained and may be used for evaluation of the database storage system. Advantageously, the performance of a database storage system may be tested and measured without the encumbrances of transaction processing overhead due to actual database processing.

27 Claims, 4 Drawing Sheets

STRESS TESTING DATABASE STORAGE

FIELD OF THE INVENTION

Embodiments of the present invention relate to enterprise storage. More particularly, embodiments of the present invention provide a method and system for stress testing database storage.

BACKGROUND ART

The term "enterprise storage" is generally applied to a combination of intelligent storage systems, software and services. Together, such products and services enable large organizations or "enterprises," e.g., businesses or governmental organizations, to store, retrieve, manage, protect and share information from a variety of major computing environments, including for example, UNIX, Windows and mainframe platforms. Enterprise storage may seek to unify a large segment of an organization's information storage needs into a single system of, for example, many terabytes of storage, rather than have the information widely distributed and associated with diverse individual computers.

Over the past several years, many advantages of enterprise storage have been realized. Among the advantages are lower cost per unit of storage, more efficient use of available storage, consistent backup and restoration methodologies and more favorable security. For these reasons, and others, many organizations have implemented and rely upon enterprise storage as an organizational strategic information technology.

With the widespread use of enterprise storage, an on-going need exists for enterprise storage users to evaluate the performance of existing enterprise storage systems and new offerings into the marketplace. Further, manufacturers of enterprise storage systems, both hardware and software, have a need to evaluate the performance of new and competitive offerings.

Unfortunately, conventional performance measuring or "benchmarking" products typically do not directly measure the performance of an enterprise storage system. For example, one well-known load testing product is LoadRunner®, commercially available from Mercury Interactive Corporation of Sunnyvale, Calif. This product is a load testing tool that predicts application system behavior and performance. It exercises an entire enterprise infrastructure (for example, including processors and network links) by emulating thousands of users and employs performance monitors to identify and isolate problems. Such conventional load testing tools are predominately transaction based. For example, they may record typical end-user and other processing tasks and play them back to create a load upon a system. Transaction-based tools model typical transactions that an entire database system may be supporting.

For example, a transaction of on-line commerce may begin with a database search, involving many individual read operations from a storage system, to identify product(s) meeting a search criteria. Continuing the transaction may further require an inquiry of another database to determine a quantity of product in inventory. Completion of the transaction may require additional reads and writes of a storage system to capture customer and billing information.

While conventional transaction-based load testing tools have their applications, they do not directly measure or report on the performance of the storage system itself. As described in the example above, in addition to processing time and network latency, there may be many storage operations, both reading and writing, involved in a transaction. In addition, the number, sequence and timing of storage operations may vary among different types of transactions, according to differing types of transactions supported by an enterprise. Further, certain aspects of a database transaction system designed to improve the performance of transaction processing, for example, disk caching, may mask the actual performance of a storage system.

Accordingly, a need exists to directly measure the performance of an enterprise storage system. A further need exists measuring the performance of an enterprise storage system in a manner that is compatible and complimentary with the tools and processes which make use of an enterprise storage system. A still further need exists for the above mentioned needs to be achieved with a scalable and cross-platform architecture.

SUMMARY OF THE INVENTION

Embodiments of the present invention directly measure the performance of an enterprise storage system. Further embodiments of the present invention measure the performance of an enterprise storage system in a manner that is compatible and complimentary with the tools and processes which make use of an enterprise storage system. Still further embodiments of the present invention provide for the above-mentioned needs to be achieved with a scalable and cross-platform architecture.

A method and system for stress testing database storage are disclosed. Stress testing software generates read and/or write commands to a database engine. Preferably, the read and write commands adhere to a desired ratio of reads to writes. The commands are interpreted by the database engine. The database engine issues read and/or write instructions to a database storage system. Multiple instances of the stress testing software may be spawned against a plurality of databases in order to achieve a desired aggregate rate of operations to the database storage system. Performance measurements of the database storage system are obtained and may be used for evaluation of the database storage system. Advantageously, the performance of a database storage system may be tested and measured without the encumbrances of application processing overhead due to other processing which takes place.

DETAILED DESCRIPTION OF THE INVENTION

Figure 1:
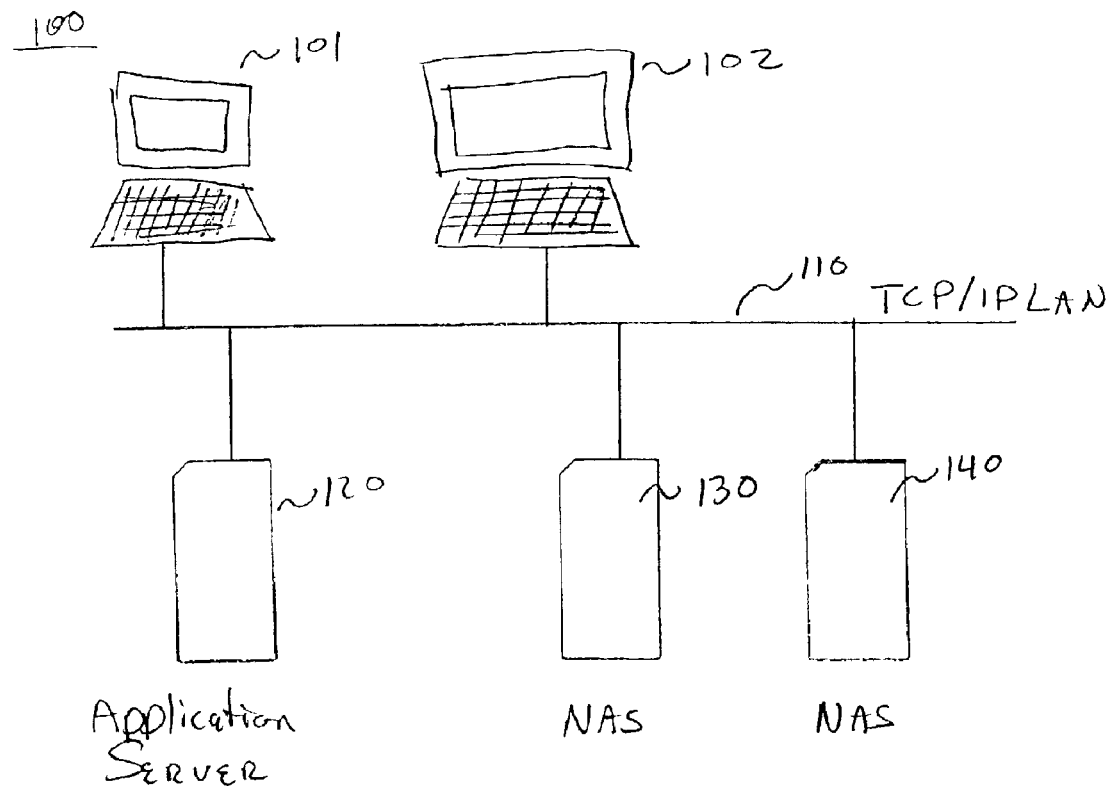
FIG. 1 illustrates a network arrangement featuring a well-known storage architecture known as Network Attached Storage, upon which embodiments of the present invention may be practiced.

In the following detailed description of the present invention, stress testing database storage, numerous specific details are set forth in order to provide a thorough understanding of the present invention. However, it will be recognized by one skilled In the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., process 300) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "undetermining" or "scrolling" or "displaying" or "recognizing" or "generating" or "assigning" or "initiating" or "collecting" or "transferring" or "synchronizing" or "accessing" or "retrieving" or "receiving" or "issuing" or "measuring" or "conveying" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Stress Testing Database Storage

Embodiments of the present invention are described in the context of a diverse network of computer systems and support peripherals, for example stand-alone storage systems. However, it is appreciated that the present invention may be utilized in other types of computer systems, including embedded and distributed systems, where it may be necessary or desirable to stress test database storage.

Storage costs as a percentage of the total Information Technology (IT) budget of modem organizations have steadily climbed and now make up its largest component. The nature of data has evolved from being an important part of an organization to being the lifeblood of a company today. The very competitiveness of many organizations depends upon how much relevant customer and market data Is collected and, perhaps of greater importance, how that information is managed to extract information for decision-making. Consequently, the type and quality of storage infrastructure is critical to the success of many organizations. The Internet has been a primary catalyst for the explosion of data. Enterprises with electronic commerce operations consume huge amounts of data. IT researchers report that many organizations are doubling the amount of data they have to manage every year. In addition, companies have a greater need to maintain more data online for business or legal reasons. The type of data is also changing dramatically; it is no longer predominately textual and numeric. Web users have grown to expect graphics, audio, and video file attachments. A simple audio file may easily take up 1 MB; video files are even hungrier for storage. A two-minute video file may require 10 MB of storage.

Electronic commerce requires 100% access to data around the clock. Geographic and time-diverse workforces place similar demands for "anytime" access to storage. Many people consider the effective gathering, moving, and storing of data the most important aspect of a modern enterprise. As a consequence, the marketplace has developed a wide variety of approaches to solve the enterprise storage problem.

FIG. 1 illustrates a network arrangement 100 featuring a well-known storage architecture known as Network Attached Storage (NAS), upon which embodiments of the present invention may be practiced. Desktop computer 101 and workstation 102 are coupled to a TCP/IP local area network 110. Application server 120, for example a Solaris server, is coupled to network 110. Application server 120 may, for example, host an enterprise's intranet web site.

Network attached storage devices 130 and 140 are coupled to network 110. Network attached storage devices generally, and devices 130 and 140 specifically, are attached to a network, for example, a local Ethernet, and serve files to a multitude of clients on that network. Network Attached Storage provides common storage for needed files that a large number of heterogeneous clients can access via a network. Common access protocols used by NAS are NFS (often used by Unix clients) and CIFS (used by Windows clients). The NAS architecture allows numerous storage devices, e.g., rotating magnetic hard drives, tape storage units and optical drives, to be coupled to the NAS device, e.g., NAS device 130. As a result, an NAS device may provide virtually unlimited storage, which is available to other computer systems on the network. In general, storage capacity may be added without detrimental effect to the network operation. In addition, the use of well know technologies, e.g., redundant arrays of independent disks and redundant power supplies, may make NAS devices highly reliable storehouses of information.

One drawback to network attached storage is that it typically operates at a file level. A file is typically a complex data structure, which may vary in composition among a variety of operating systems (e.g., Widows, Unix, Macintosh, etc.) Consequently, a complex function of network attached storage devices is to recognize and manage differing file types corresponding to differing operating systems.

Figure 2:
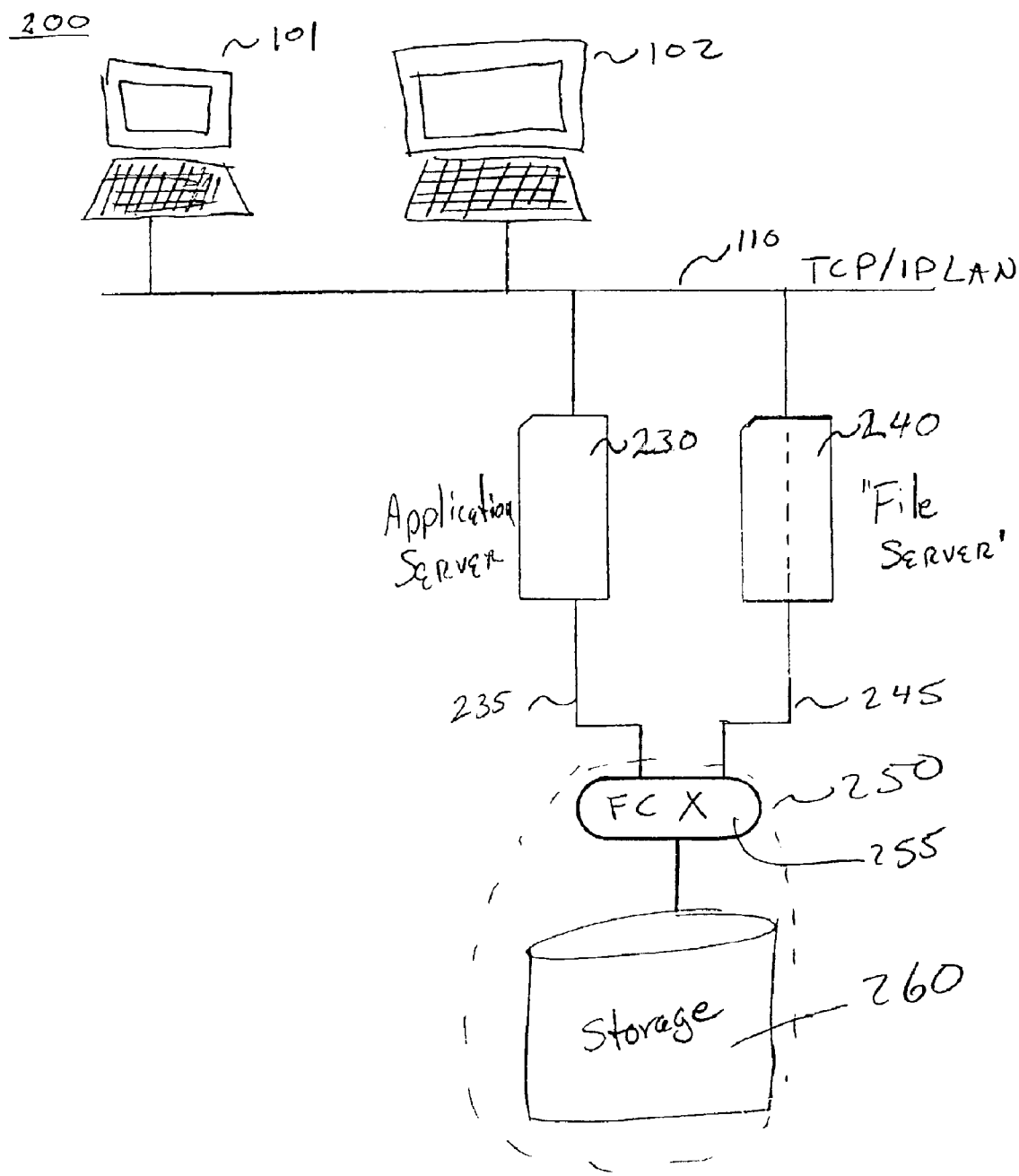
FIG. 2 illustrates a network arrangement featuring another well-known storage architecture known as Storage Area Network, upon which embodiments of the present invention may be practiced.

FIG. 2 illustrates a network arrangement 200 featuring another well-known storage architecture known as Storage Area Network (SAN), upon which embodiments of the present invention may be practiced. Desktop computer 101 and workstation 102 are coupled to a TCP/IP local area network 110. Application server 230, for example a Solaris server, is coupled to network 110. Application server 230 may, for example, host an enterprise's intranet web site.

Enterprise storage for network arrangement 200 is provided by Storage Area Network (SAN) 250. SAN 250 typically comprises a Fibre Channel (FC) switch 255 and direct attached storage devices 260. While there is no prescriptive relationship between a SAN and the Fibre Channel (FC) protocol, virtually all conventional SANs are implemented with Fibre Channel and the terms are frequently (and imprecisely) used interchangeably. File server 240 may be a protocol converter or bridge between network 110 and fibre channel link 245. Application server 230 is linked to fibre channel switch 255 via fibre channel link 235. It is to be appreciated that embodiments of the present invention are well suited to differing linkage protocols, e.g., iSCSI.

In contrast to network attached storage, a storage area network's primary purpose is transferring data between computer systems and storage units, or between storage units. SANs typically operate on data at the block level. In this manner a storage area network acts as a virtual storage device, for example, "pretending" to be a computer's hard drive, rather than as a file server. Storage area networks allow businesses and other enterprises to optimize bandwidth, performance and capacity independently. Application servers may also increase their performance for application processing because they no longer have the burden of storage management. It is to be appreciated that embodiments of the present invention are well suited to other types of functional couplings to storage devices, for example, direct attached storage.

Enterprise Resource Planning, ERP, is an industry term describing a broad set of activities 'supported by multi-module application software that helps business operations (e.g., a manufacturer or electronic commerce company) manage the important parts of its business, including product planning, parts purchasing, maintaining inventories, interacting with suppliers, providing customer service, and tracking orders. ERP may also include application modules for the finance and human resources aspects of a business. Typically, an ERP system uses or is integrated with a relational database system. The deployment of an ERP system can involve considerable business process analysis, employee retraining, and new work procedures. ERP may consume large amounts of enterprise storage.

Much of an enterprise's non-ERP information is also organized and maintained as a database by a database engine. Examples include static web pages, electronic commerce and computer-aided design systems. Consequently, the manner in which a preferred data base engine makes use of an enterprise storage system is critical to the enterprise.

Figure 3:
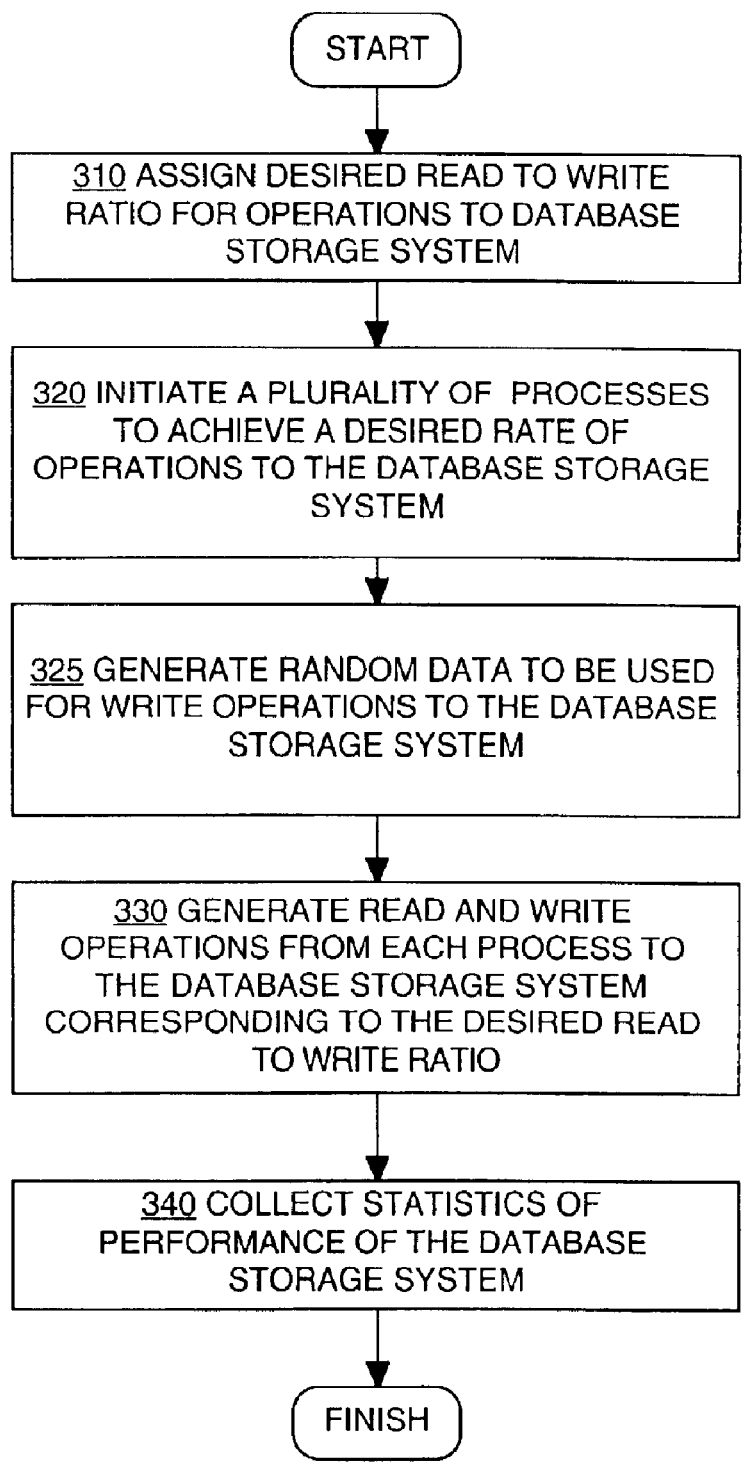
FIG. 3 is a flow chart illustrating a method for stress testing database storage, according to an embodiment of the present invention.

FIG. 3 is a flow chart illustrating a method 300 for stress testing database storage, according to an embodiment of the present invention. In step 310, a desired read to write ratio for operations to a database storage system is assigned. Preferably, this ratio may be set by a user operating a testing process. Subsequently, this ratio may be used to generate read and/or write operations to a database storage system. At least three ratio values may be of interest in understanding the performance of the database storage system. As there may be a performance difference between read and write operations, e.g., read operations may occur faster than write operations, both extremes of all reads and all writes should be tested. Additionally, a read to write ratio approximating a desired set of real applications should also be used in order to simulate an actual use of the database storage system. It is to be appreciated that other read to write ratios are well suited to embodiments of the present invention.

In step 320, a plurality of processes is initiated to achieve a desired rate of operations to the database storage system. The processes may be initiated on a single computer system or on other computer systems sharing a means of communication, for example, attached to a local area network. The number of processes initiated may be determined by a desired rate of operations to be directed to the database storage system. For example, if a single process is capable of generating 1,000 read operations per second to the database storage system, then it may be desirable to initiate ten process threads in order to generate 10,000 read operations per second to the database storage system. Preferably, the desired rate of operations to the database storage system may be selected by a testing administrator.

In general, at least two rates of operations to the database storage system may provide illustrative information on the performance of the database storage system. A first rate to be tested may be a rate that other studies have indicated to be required for a specific task. For example, it may be known that an application will generate up to 5,000 database requests per second at peak usage. Testing the database storage system at this rate may determine if the database storage system is suitable for this application. It may also be generally informative to initiate processes until a maximum rate of operations to the database storage system is determined.

In optional step 325, random data to be used for write operations to the database storage system may be generated. Preferably, data used for write operations should correspond in structure to the type of data typically stored in the database.

In step 330, read and write operations are generated from each of the processes to the database storage system corresponding to the read to write ratio set in step 310. For example, if the read to write ratio was assigned to be 50% reads and 50% writes, a process may generate one write operation for every read operation generated. Preferably, the read and write operations take the form of read and write commands to a database engine, which in turn initiates the actual read and write operations to the database storage system. By this novel use of the database engine, the read and write operations to the database storage system directly correspond to the actual read and write operations of a production environment that uses the database engine. By having a strong correlation between the stress test and production environments, the test results should be highly indicative of the production behavior of the database storage system.

It is to be appreciated that the assigned read to write ratio may be achieved over varying time intervals, according to an embodiment of the present invention. For example, a 50/50 ratio may be implemented as a read operation followed immediately by a write operation, or by 500 read operations followed by 500 write operations. In addition, write and read operations may be interwoven according to a random distribution, for example the Poisson distribution. The Poisson distribution is conventionally used to model the number of events occurring within a given time interval. Further, an aggregate ratio may be achieved across a plurality of processes, according to another embodiment of the present invention. For example, one process may generate only read operations, while a second process may generate only write operations.

In step 340, statistics of the performance of the database storage system are collected. The statistics collected may include, for example, numbers of read and write operations attempted to the database storage system, numbers of read arid write operations completed by the database storage system, numbers of read and write operations requested of the database engine by the process(es), etc.

Figure 4:
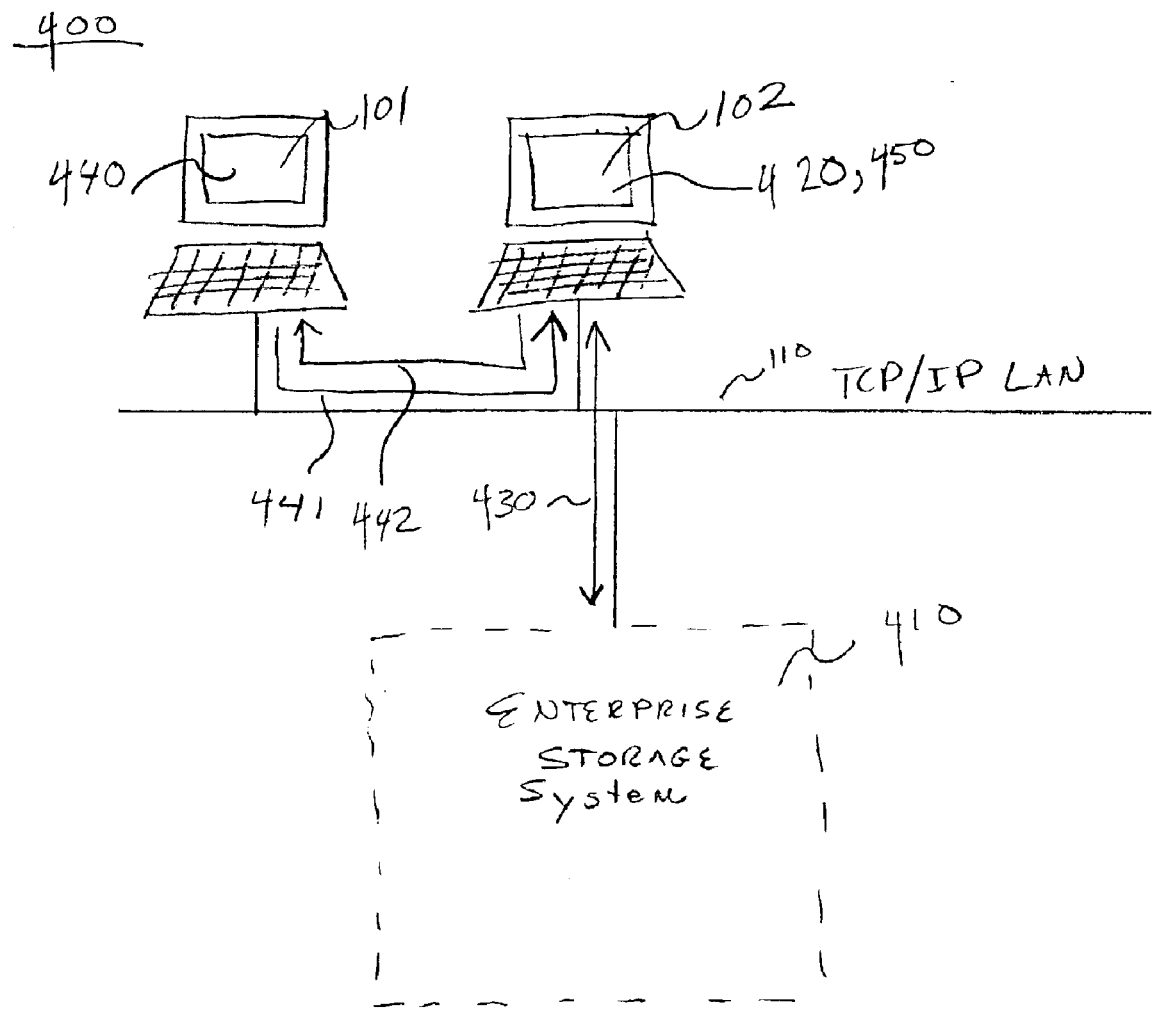
FIG. 4 is a data flow diagram illustrating data flow of stress testing of data base storage, according to an embodiment of the present invention.

FIG. 4 is a data flow diagram illustrating data flow of stress testing of database storage, according to an embodiment of the present invention. Enterprise storage system 410 is the system to be tested. Enterprise storage system 410 may be network attached storage, a storage area network, combinations of these two architectures or other types of enterprise storage, according to an embodiment of the present invention.

Important measures of enterprise storage system 410's performance include the number of read operations per unit time (e.g., second), the number of write operations per unit time and the number of a mixture of read and write operations per unit time that enterprise storage system 410 can perform. Such information may allow customers and system designers to compare competing offerings and architectures in order to determine relative or absolute performance.

According to an embodiment of the present invention, an instance of a database engine 420 may be operating on a computer system of network arrangement 400, for example workstation 102. Database engine 420 reads and writes to enterprise storage system 410 via communication 430.

An instance of stressing software 440 may be initiated on a computer system of network arrangement 400, for example desktop computer 101. In an exemplary operation, stressing software 440 generates a read request or command 441 of database engine 420. In response to the read request 441, database engine 420 performs a read operation to enterprise storage system 410. Enterprise storage system 410 returns the requested information to database engine 420. Database engine 420 completes the operation by returning the requested information 442 to stressing software 440 via the network.

An exemplary write operation may comprise stressing software 440 generating a random data pattern, and requesting of database engine 420 that the data be stored in a database. Database engine 420 sends the data to enterprise storage system 410. Enterprise storage system 410 signals database engine 420 that the data has been successfully stored, and database engine 420 notifies stressing software 440 that the information has been successfully stored in the database.

Stressing software 440 may generate read and/or write requests as fast as software 440 may execute. According to an embodiment of the present invention, additional instances of stressing software 440 may be initiated. Such additional instances may be on any system attached to network 110, including for example desk top computer 101, workstation 102 or other computers attached to network 110 (not shown). Additional instances of stressing software 440 may be initiated until, for example, a desired or a maximum rate of operations to enterprise storage system 410 is achieved. For example, if a single instance of stressing software 440 is capable of generating 1,000 read requests per second, ten instances of stressing software 440 may produce an aggregated rate of approximately 10,000 read requests per second.

Monitor software 450, for example operating on workstation 102, collects performance measurements of enterprise storage system 410, including, for example, numbers of read and write operations attempted to enterprise storage system 410, numbers of read and write operations completed by enterprise storage system 410, numbers of read and write operations requested of database engine 420 by the instance (s) of stressing software 440, etc. Monitor software 450 may, for example, measure operations by monitoring communication 430. Performance measurements may be displayed on a computer running monitor software 450 and/or stored for future use. Monitor software 450 may be a part of a database software suit, for example provided by the database software vendor.

According to an embodiment of the present invention, stressing software 440 should be written in cross-platform programming language, e.g., Java. This may allow stressing software 440 to operate on a wide variety of types of computers systems, e.g., Unix workstations, Personal Computers and Macintosh computers. As most enterprises have more than one type of computer coupled to various networks, a cross-platform capability allows great flexibility in the configuration of a stress test.

According to another embodiment of the present invention, stressing software 440 should generate read and write requests that are compliant with Structured Query Language. Structured Query Language (SQL) is a standard interactive and programming language for requesting information from, and updating a database. Although SQL is both an ANSI and an ISO standard, many database products support SQL with proprietary extensions to the standard language. Queries take the form of a command language that enables a user to select, insert, update, find out the location of data, and so forth. There is also a programming interface. By generating SQL compliant database requests, stressing software 440 may be compatible with most database engines, allowing software reuse and testing with multiple database engines.

According to an alternative embodiment of the present invention, the effectiveness and performance of storage routing, for example, in a storage area network.

Advantageously, and in contrast to the conventional art, embodiments of the present invention may measure performance of a database storage system without the encumbrances of application processing overhead. For example, no processing of data retrieved from and/or stored within the database storage system is required. In addition, testing may be set up quickly, without knowledge of, or set up of a particular application, e.g., an on-line shopping application.

Embodiments of the present invention directly measure the performance of an enterprise storage system. Further embodiments of the present invention measure the performance of an enterprise storage system in a manner that is compatible and complimentary with the tools and processes which make use of an enterprise storage system. Still further embodiments of the present invention provide for the above-mentioned needs to be achieved with a scalable and cross-platform architecture.

The preferred embodiment of the present invention, stress testing database storage, is thus described. While the present invention has been described in particular embodiments, it should be appreciated that the present invention should not be construed as limited by such embodiments, but rather construed according to the below claims.

What is claimed is:

1. A computer implemented method for stress testing a database storage system comprising:

assigning a read to write ratio for operations to said database storage system;

initiating a plurality of processes to achieve a rate of operations to said database storage system;

generating read and write operations from said processes to said database storage system corresponding to said read to write ratio; and collecting performance statistics of said database storage system.

2. The method of claim 1 wherein said generating comprises said processes sending commands to a database engine.

3. The method of claim 2 wherein said database engine forms read and/or write operations to said database storage system in response to said commands from said processes.

4. The method of claim 2 wherein said database engine is substantially compliant with structured query language.

5. The method of claim 1 wherein said read and write operations are interleaved according to a random distribution.

6. The method of claim 5 wherein said random distribution is substantially a Poisson distribution.

7. The method of claim 1 wherein software of said processes is written in a cross-platform language.

8. The method of claim 7 wherein said cross-platform language is substantially compliant with Java.

9. The method of claim 1 further comprising generating random data for said write operations to said database storage system.

10. A method for stress testing a database storage system comprising:

receiving first commands at a database engine software module from a plurality of stress test software modules, said first commands to retrieve records of information from a database, wherein said plurality of stress test software modules achieve in aggregate a desired rate of transfers of said records of information from said database storage system to said database engine software module and wherein said plurality of stress test software modules ignore content of said records of information; and issuing second commands from said database engine software module to said database storage system to retrieve said records of information.

11. The method of claim 10 wherein software of said stress test software modules are written in a cross-platform language.

12. The method of claim 11 wherein said cross-platform language is substantially compliant with Java.

13. The method of claim 10 wherein said first commands are substantially compliant with structured query language.

14. The method of claim 10 wherein at least two of said stress test software modules operate on separate computer systems.

15. The method of claim 10 further comprising measuring performance of said database storage system.

16. A system of computers comprising:

a plurality of computers coupled to a network;

an enterprise storage system coupled to said network;

a database engine software module operative on one of said plurality of computers;

said plurality of computers also for performing a method of stress testing database storage by;

receiving first commands at a database engine software module from a plurality of stress test software modules, said first commands to retrieve records of information from a database, wherein said plurality of stress test software modules achieve in aggregate a desired rate of transfers of said records of information from said database storage system to said database engine software module and wherein said plurality of stress test software modules ignore content of said records of information; and issuing second commands from said database engine software module to said database storage system to retrieve said records of information.

17. The system of claim 16 wherein instructions for said sending are written in a cross-platform language.

18. The system of claim 17 wherein said cross-platform language is substantially compliant with Java.

19. The system of claim 16 wherein said first commands are substantially compliant with structured query language.

20. The system of claim 16 wherein at least two separate computer systems send said first commands.

21. The method of claim 16 further comprising measuring performance of said database storage system.

22. A computer-readable medium having computer-readable program code embodied therein for causing a computer system to perform a method for stress testing a database storage system, said method comprising:

receiving first commands at a database engine software module from a plurality of stress test software modules, said first commands to retrieve records of information from a database, wherein said plurality of stress test software modules achieve in aggregate a desired rate of transfers of said records of information from said database storage system to said database engine software module and wherein said plurality of stress test software modules ignore content of said records of information; and issuing second commands from said database engine software module to said database storage system to retrieve said records of information.

23. The computer-readable medium of claim 22 wherein software of said stress test software modules are written in a cross-platform language.

24. The computer-readable medium of claim 23 wherein said cross-platform language is substantially compliant with Java.

25. The computer-readable medium of claim 22 wherein said first commands are substantially compliant with structured query language.

26. The computer-readable medium of claim 22 wherein at least two of said stress test software modules operate on separate computer systems.

27. The computer-readable medium of claim 22 further comprising computer-readable program code for measuring performance of said database storage system.

* * * * *